US012475071B2

(12) United States Patent
Meyer et al.

(10) Patent No.: US 12,475,071 B2
(45) Date of Patent: Nov. 18, 2025

(54) INDUSTRIAL ELECTRICAL CONNECTOR HAVING A DATA DIODE MODULE

(71) Applicant: HARTING ELECTRIC STIFTUNG & CO. KG, Espelkamp (DE)

(72) Inventors: Thorsten Meyer, Brockum (DE); Till Riechmann, Stemwede (DE); Markus Friesen, Espelkamp (DE)

(73) Assignee: HARTING ELECTRIC STIFTUNG & CO. KG, Espelkamp (DE)

( * ) Notice: Subject to any disclaimer, the term of this patent is extended or adjusted under 35 U.S.C. 154(b) by 7 days.

(21) Appl. No.: 18/577,212

(22) PCT Filed: Jun. 23, 2022

(86) PCT No.: PCT/DE2022/100464
§ 371 (c)(1),
(2) Date: Jan. 5, 2024

(87) PCT Pub. No.: WO2023/280345
PCT Pub. Date: Jan. 12, 2023

(65) Prior Publication Data
US 2024/0303212 A1 Sep. 12, 2024

(30) Foreign Application Priority Data
Jul. 6, 2021 (DE) ..................... 10 2021 117 400.7

(51) Int. Cl.
*G06F 13/40* (2006.01)
*H01R 13/518* (2006.01)

(52) U.S. Cl.
CPC ....... *G06F 13/4081* (2013.01); *H01R 13/518* (2013.01)

(58) Field of Classification Search
None
See application file for complete search history.

(56) References Cited

U.S. PATENT DOCUMENTS

2003/0194914 A1 10/2003 Duck et al.
2015/0199603 A1 7/2015 Troeger et al.
(Continued)

FOREIGN PATENT DOCUMENTS

DE 29601998 U1 4/1996
DE 20117856 U1 3/2003
(Continued)

OTHER PUBLICATIONS

International Search Report and Written Opinion, mailed Nov. 4, 2022, for International Patent Application No. PCT/DE2022/100464. (14 pages) (with English translation of International Search Report).
(Continued)

*Primary Examiner* — Idriss N Alrobaye
*Assistant Examiner* — Dayton Lewis-Taylor
(74) *Attorney, Agent, or Firm* — Seed Intellectual Property Law Group LLP

(57) ABSTRACT

A modular industrial electrical connector is provided having a holding frame; at least two electrical connector modules which can be inserted into the holding frame; a data diode module which is designed for communication with the at least two electrical connector modules; wherein, for at least one of the two electrical connector modules, unidirectional data transfer can be established by the data diode module. REPLY BLOCKING is carried out in that data are sent from an electrical connector module to an electrical device via the data diode module, wherein data are sent back from an electrical device to the data diode module and are blocked by the data diode module, and/or CONTROL BLOCKING is carried out in that data are transmitted from an electrical device to the data diode module and are forwarded by the data diode module to an electrical connector module, wherein data are sent back from the electrical connector (Continued)

module to the data diode module and are blocked by the data diode module.

9 Claims, 2 Drawing Sheets

(56) References Cited

U.S. PATENT DOCUMENTS

| | | | | |
|---|---|---|---|---|
| 2015/0280351 | A1 | 10/2015 | Bertsch | |
| 2016/0093980 | A1 | 3/2016 | Beischer et al. | |
| 2016/0196454 | A1 | 7/2016 | Soffer | |
| 2016/0276778 | A1 | 9/2016 | Beischer et al. | |
| 2018/0184627 | A1 | 7/2018 | Liang | |
| 2019/0349747 | A1 * | 11/2019 | Dunn | H04L 63/0428 |

FOREIGN PATENT DOCUMENTS

| | | | |
|---|---|---|---|
| DE | 202011050643 | U1 | 8/2011 |
| DE | 202013103611 | U1 | 9/2013 |
| DE | 102012107270 | A1 | 2/2014 |
| DE | 102012110907 | A1 | 5/2014 |
| DE | 102013106279 | A1 | 12/2014 |
| DE | 202015101777 | U1 | 5/2015 |
| DE | 102015104562 | A1 | 9/2016 |
| DE | 102015213400 | A1 | 1/2017 |
| DE | 102017114441 | A1 | 8/2018 |
| DE | 102017003198 | A1 | 10/2018 |
| EP | 0860906 | A2 | 8/1998 |
| EP | 1026788 | A1 | 8/2000 |
| EP | 1353412 | A2 | 10/2003 |
| EP | 2510589 | A1 | 10/2012 |
| EP | 2510590 | A1 | 10/2012 |
| EP | 2917974 | A1 | 9/2015 |
| EP | 2979326 | A1 | 2/2016 |
| EP | 3067993 | A1 | 9/2016 |
| EP | 3203702 | A1 | 8/2017 |
| GB | 927851 | A | 6/1963 |
| WO | WO 2009047556 | A1 | 4/2009 |
| WO | WO 2015149757 | A2 | 10/2015 |

OTHER PUBLICATIONS

Office Action, dated Jun. 24, 2022, for German Patent Application No. 10 2021 117 400.7 (6 pages).

* cited by examiner

INDUSTRIAL ELECTRICAL CONNECTOR HAVING A DATA DIODE MODULE

BACKGROUND

Technical Field

Embodiments of the present disclosure relate to a modular industrial plug connector and a method for unidirectional transmission of data in a modular industrial plug connector.

Plug-connector modular systems are needed in order to be able to adapt a plug connector—in particular, a heavy rectangular plug connector—flexibly to specific requirements regarding the transmission of signals and energy, for example, between two electrical devices. A modular plug connector is employed in order to generate, evaluate or relay, in decentralized machine control systems or plant control systems, electrical, electronic, optoelectronic or pneumatic control signals directly in the unit to be triggered within a plug connector.

Data diodes are used for unidirectional transmission of data in sensitive networks. In this case, it is a question of electronic components that have been set up via software for unidirectional transmission of data.

Description of the Related Art

In the prior art, plug-connector modular systems using a modular frame—also known as a retaining frame or module frame—are disclosed in numerous printed documents and publications, are presented at trade fairs, and are in use, particularly in the industrial environment, in the form of heavy-duty plug connectors. For instance, they are described in printed documents DE 10 2013 106 279 A1, DE 10 2012 110 907 A1, DE 10 2012 107 270 A1, DE 20 2013 103 611 U1, EP 2 510 590 A1, EP 2 510 589 A1, DE 20 2011 050 643 U1, EP 860 906 A2, DE 296 01 998 U1, EP 1 353 412 A2, DE 10 2015 104 562 A1, EP 3 067 993 A1, EP 1 026 788 A1, EP 2 979 326 A1, EP 2 917 974 A1. As a rule in these cases, several like or different plug-connector modules are retained jointly in a modular frame and are incorporated into a plug-connector housing. The functionality of a plug connector formed by this means is accordingly very flexible. For example, pneumatic modules, optical modules, modules for transmitting electrical energy and/or electrical analog and/or digital signals may find application in the plug-connector modular system. Plug-connector modules are also increasingly undertaking metrological tasks and data-processing tasks.

Machine data—in particular, also sensitive data for monitoring and/or controlling the corresponding machine—are often communicated via plug connectors of such a type. In the meantime, machines or entire machine plants are falling victim to so-called hacker attacks. In the course of these attacks, electronic points of weakness are discovered and are often employed to cause damage. As a result, machine stoppages and associated losses of production may arise.

In order to ward off such hacker attacks, firewalls for the company networks are frequently employed. If the firewalls are overcome, the machines can be manipulated by the attacker, and/or sensitive data can be diverted away from the machines.

BRIEF SUMMARY

Embodiments of the disclosure provide for a secure operation of machines, in particular, of production machines.

The modular industrial plug connector according to an embodiment of the invention may be summarized as including: a retaining frame into which diverse plug-connector modules are capable of being inserted and fixed and are also capable of being detached and removed. Such retaining frames may have been variably configured. Such retaining frames have already been sufficiently described above.

The modular industrial plug connector may include at least two plug-connector modules which are capable of being inserted into the retaining frame. As a rule, the retaining frame, together with the plug-connector modules, is fixed into a plug-connector housing or ancillary housing which in this case is then likewise associated with the industrial plug connector. But there are also fields of application—in a switch cabinet, for instance—where a plug-connector housing or ancillary housing is dispensed with.

The plug connector may further include a data-diode module which has been set up for communication with the at least two plug-connector modules. This means that the data-diode module is able to communicate with the plug-connector modules either via a data line or in wireless manner.

By virtue of the data-diode module, a unidirectional transmission of data is capable of being set in at least one of the two plug-connector modules. This means that data are relayed in only one direction via this plug-connector module or via the plug-connector modules. By this means, individual and, in particular, very sensitive industrial plants or facilities can be protected, even when the firewall of the network being employed fails.

The data-diode module is preferentially likewise capable—in a manner analogous to that for the plug-connector modules—of being inserted into the retaining frame and fixed therein. For this purpose, the data-diode module preferentially has substantially the same basic shape as the at least two plug-connector modules. The basic shape of a plug-connector module has already been elucidated above. The data-diode module has substantially been configured in the form of a right parallelepiped and includes on two opposing narrow sides fastening lugs or mounting means which are capable of being fitted into corresponding recesses or windows in the retaining frame. The necessary electronics—which substantially consist of a printed circuit board, a processor and, where appropriate, also a data memory—are then located within a right-parallelepipedal housing.

In one embodiment, the data-diode module may contain contact elements for communication. In this case, the data-diode module can be interposed if a plug-connector module of the industrial plug connector is communicating with a mating-plug-connector module of an electrical device. The plug-connector modules communicate with one another via the data diode, the data diode being able to block one data-flow direction.

A data-flow direction of the industrial plug connector is preferentially capable of being set and capable of being switched over by the data-diode module. The data-diode module can carry out a so-called:

- RESPONSE BLOCKING, by data being sent from a plug-connector module to an electrical device via the data-diode module, wherein data are sent back from an electrical device to the data-diode module and are blocked by the data-diode module.

In this case, no data can get away from the electrical device and also cannot be intercepted in an undesirable manner.

The data-diode module can also carry out a so-called:

CONTROL BLOCKING, by data being sent from an electrical device to the data-diode module and being relayed from the data-diode module to a plug-connector module, wherein data are sent back from the plug-connector module to the data-diode module and are blocked by the data-diode module. By this way, data pertaining to the electrical device can be collected and evaluated, for instance for the purpose of monitoring a frictionless production process. At the same time, the device, so long as it is working ideally, cannot be manipulated by extraneous data.

In one embodiment, the communication between the data-diode module and the at least two plug-connector modules may take place via a bus system integrated within the retaining frame. The bus system may include at least one data bus and an associated data-conducting path for electronic transmission of data. The retaining frame preferentially has a rectangular cross-section with two opposing short sides and two opposing long sides, the data-conducting path extending over at least one of the two long sides. The plug-connector modules and the data-diode module include appropriate electrical points of contact with, or interfaces to, the data-conducting path.

By virtue of the data-diode module, the corresponding plug-connector modules of two communication partners—for instance, plug connectors and mating plug connectors—no longer communicate directly with one another. The data-diode module is electronically interposed, without the communication partners noticing this.

Some embodiments provide a method for unidirectional transmission of data in a modular industrial plug connector that may include at least two plug-connector modules and a data-diode module, wherein a RESPONSE BLOCKING is carried out, by data being sent from a plug-connector module to an electrical device via the data-diode module, wherein data are sent back from an electrical device to the data-diode module and are blocked by the data-diode module, or wherein a CONTROL BLOCKING is carried out, by data being sent from an electrical device to the data-diode module and being relayed from the data-diode module to a plug-connector module, wherein data are sent back from the plug-connector module to the data-diode module and are blocked by the data-diode module.

In the case of the unidirectional transmission of data, the data-diode module offers the following possibilities: a) A response blocking or a control blocking is set in a first and a second plug-connector module; b) A response blocking is set in the first plug-connector module, and a control blocking is set in the second plug-connector module; and c) A response blocking or a control blocking is set in the first plug-connector module, and the second plug-connector module carries out a bidirectional transmission of data.

BRIEF DESCRIPTION OF THE SEVERAL VIEWS OF THE DRAWINGS

An embodiment of the disclosure is represented in the drawings and will be described in more detail in the following.

The figures may contain partially simplified, schematic representations. In part, identical reference symbols are used for like, but possibly not identical, elements. Various views of like elements might have been scaled differently.

DETAILED DESCRIPTION

Figure 1:
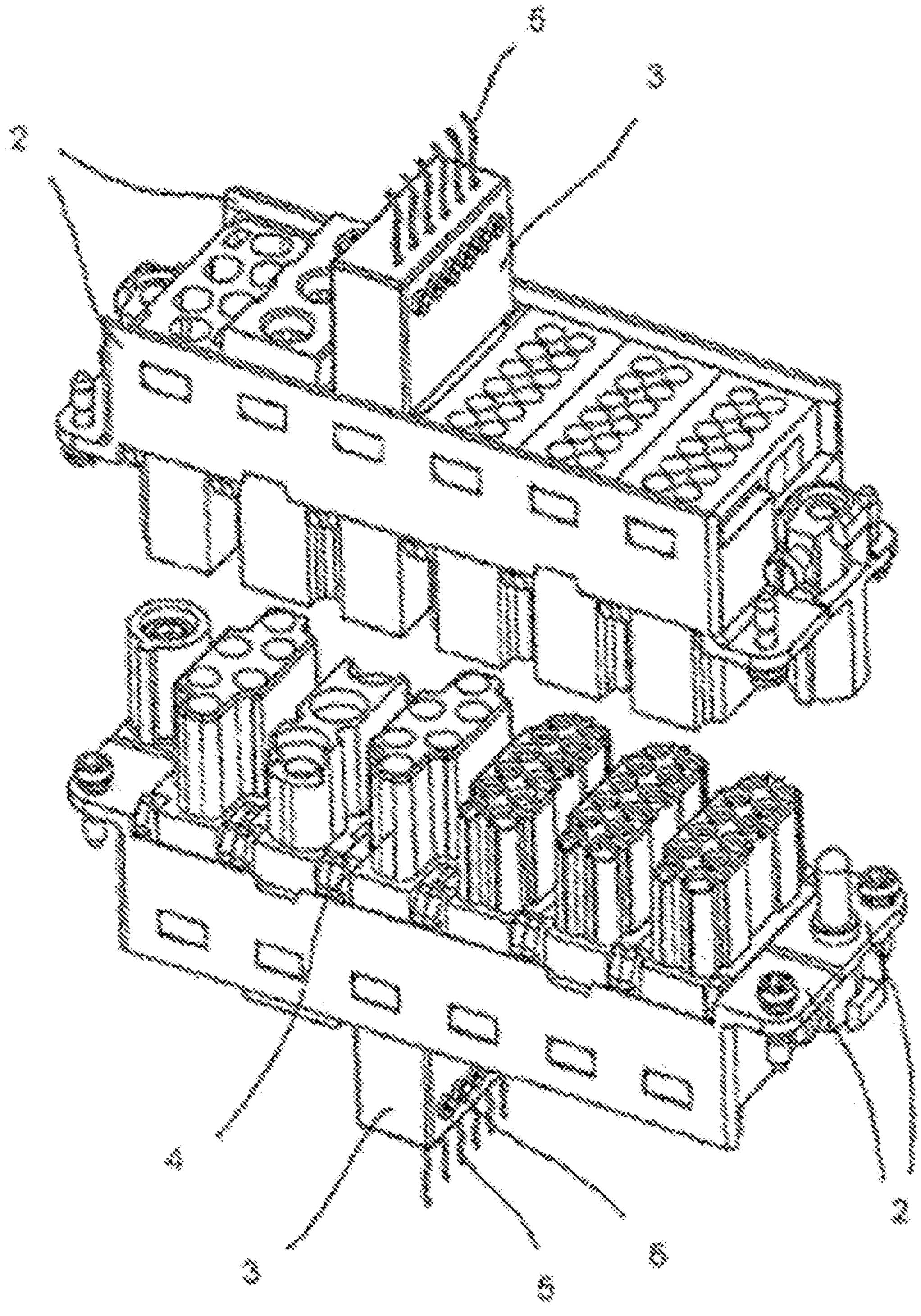
FIG. 1 shows an embodiment of a plug-connector modular system.

FIG. 1 shows two plug connectors of modular construction pointing toward one another, the differing plug-connector modules 1 of which are retained in a frame 2 comprising two halves, a plug-connector housing or ancillary housing surrounding the frame (not being shown).

The differing plug-connector modules 1 offer the possibility to adapt an optimal module plug to differing transmission signals, possibly to differing current intensities, to differently combined units or to differing physical signal quantities, such as electrical, optical or pneumatic signals.

In the frame is a data-diode module 3 which contains a plug-in side 4 corresponding to a plug-in face of a plug-connector module 1 and also comprises a coupling side with pins 5.

An electronic data-diode circuit which is able to set a unidirectional data transfer in individual and/or in all plug-connector modules 1 has been implemented in the data-diode module 3.

In the embodiment example shown here, there are two data-diode modules 3 arranged opposite one another, both of which comprise pin-shaped coupling elements. Either the pins have been directly connected to the data-diode circuit permanently, or the pins are contacted therewith by a screw-terminal connection 6.

A bus system has been integrated within the retaining frame 2, with the aid of which the plug-connector modules 1 and the data-diode module 3 are communicatively connected to one another.

In the course of the data communication of an electrical device, the data-diode modules 3 have always been interposed. On the basis of an external specification, which has been installed in the respective data-diode module 3 via software, individual plug-connector modules 1 are subjected to a unidirectional transmission of data by the data-diode module 3.

Figure 2:
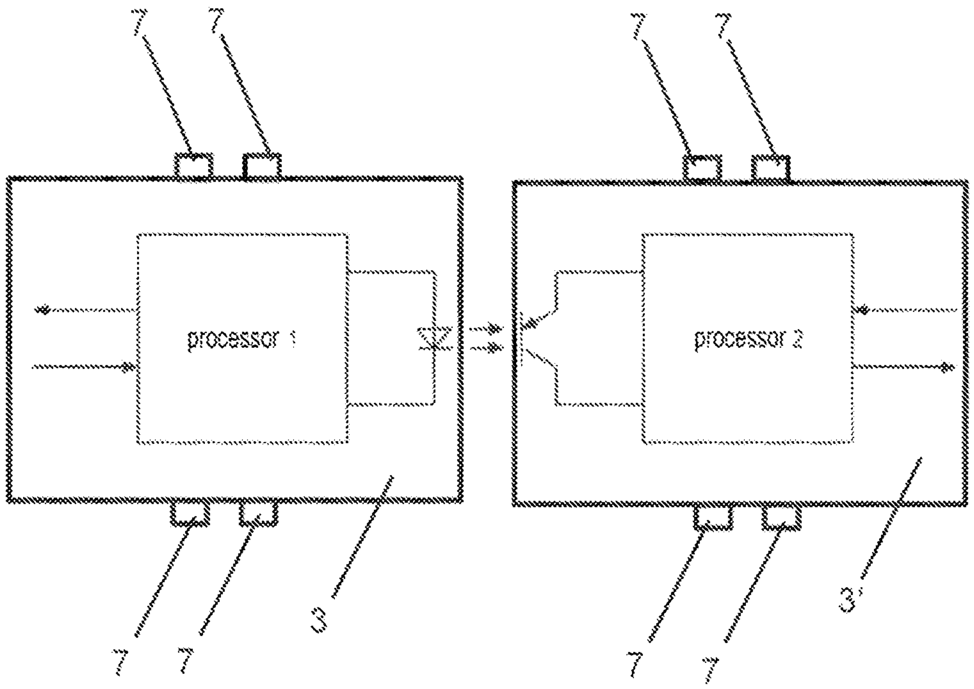
FIG. 2 shows an electronic circuit diagram of two data-diode modules communicating with one another.

To be seen in FIG. 2 is an electronic circuit diagram of a first data-diode module 3 which is connected for data processing to a second data-diode module 3'. Both data-diode modules 3, 3' comprise communication pins 7 on both sides, via which they are capable of being connected for data processing to adjacent plug-connector modules 1. By this means, the data-transmission methods described above can be realized.

Even though various aspects or features of the disclosure have been shown in the Figures in combination in each instance, to a person skilled in the art it is obvious-unless otherwise stated—that the combinations represented and discussed are not the only ones possible. In particular, units or complexes of features corresponding to one another from differing embodiment examples can be interchanged with one another. In other words, aspects of the various embodiments described above can be combined to provide further embodiments.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A modular industrial plug connector, comprising:

a retaining frame;

at least two plug-connector modules which are capable of being inserted into the retaining frame; and a data-diode module which has been set up for communication with the at least two plug-connector modules, wherein a unidirectional transmission of data in at least one of the two plug-connector modules is set via the data-diode module by carrying out a RESPONSE BLOCKING by data being sent from the plug-connector module to an electrical device via the data-diode module, wherein data is sent back from the electrical device to the data-diode module and is blocked by the data-diode module, and/or by carrying out a CONTROL BLOCKING by data being sent from an electrical device to the data-diode module and being relayed from the data-diode module to the plug-connector module, wherein data is sent back from the plug-connector module to the data-diode module and is blocked by the data-diode module.

2. The modular industrial plug connector as claimed in claim 1, wherein the data-diode module is capable of being inserted into the retaining frame in a manner analogous to that for the plug-connector modules.

3. The modular industrial plug connector as claimed in claim 1, wherein the communication between the data-diode module and the at least two plug-connector modules takes place via a bus system integrated within the retaining frame.

4. The modular industrial plug connector as claimed in claim 1, wherein the bus system exhibits at least one data bus and an associated data-conducting path for electronic transmission of data.

5. The modular industrial plug connector as claimed in claim 4, wherein the retaining frame has a rectangular cross-section with two opposing short sides and two opposing long sides, and in that the data-conducting path extends over at least one of the two long sides.

6. The modular industrial plug connector as claimed in claim 1, wherein the data-diode module has substantially the same basic shape as the at least two plug-connector modules.

7. The modular industrial plug connector as claimed in claim 1, wherein a data-flow direction of the entire industrial plug connector is capable of being set and capable of being switched over by the data-diode module.

8. A method for unidirectional transmission of data in a modular industrial plug connector that includes at least two plug-connector modules and a data-diode module, the method comprising:

carrying out a RESPONSE BLOCKING by data being sent from a plug-connector module to an electrical device via the data-diode module, wherein data is sent back from the electrical device to the data-diode module and is blocked by the data-diode module, and/or carrying out a CONTROL BLOCKING by data being sent from an electrical device to the data-diode module and being relayed from the data-diode module to a plug-connector module, wherein data is sent back from the plug-connector module to the data-diode module and is blocked by the data-diode module.

9. The method for unidirectional transmission of data in a modular industrial plug connector, as claimed in claim 8, further comprising, with the aid of the data-diode module:

setting a response blocking or a control blocking in a first and a second plug-connector module; or setting a response blocking in the first plug-connector module, and setting a control blocking in the second plug-connector module; or setting a response blocking or a control blocking in the first plug-connector module, and the second plug-connector module carries out a bidirectional transmission of data.

* * * * *